Figure 1:
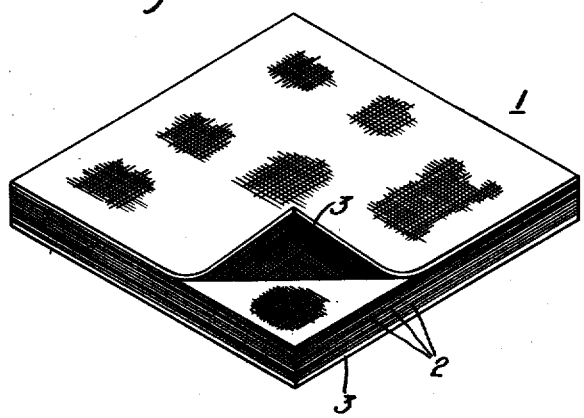

D. A. DICKEY.
METHOD OF FORMING COMPOSITE BODIES.
APPLICATION FILED DEC. 30, 1918.

1,352,436.

Patented Sept. 14, 1920.

WITNESSES:
H. J. Shelhamer
W. W. Woodman.

INVENTOR
Daniel A. Dickey
BY
Wesley G. Carr
ATTORNEY

UNITED STATES PATENT OFFICE.

DANIEL ADAM DICKEY, OF WILKINSBURG, PENNSYLVANIA, ASSIGNOR TO WESTINGHOUSE ELECTRIC & MANUFACTURING COMPANY, A CORPORATION OF PENNSYLVANIA.

METHOD OF FORMING COMPOSITE BODIES.

1,352,436.  Specification of Letters Patent.  Patented Sept. 14, 1920.

Application filed December 30, 1918. Serial No. 268,950.

*To all whom it may concern:*

Be it known that I, DANIEL A. DICKEY, a citizen of the United States, and a resident of Wilkinsburg, in the county of Allegheny and State of Pennsylvania, have invented a new and useful Improvement in Methods of Forming Composite Bodies, of which the following is a specification.

My invention relates to methods of forming molded bodies and particularly molded bodies comprising superimposed layers of sheet material impregnated with a binder which may be cured or hardened by proper treatment, such as subjecting the assembled body to heat and pressure.

More particularly, my present invention relates to the method of forming bodies having irregular outlines and it has, as its primary object, the provision of a novel means for treating or "preforming" the material to comprise the body in such manner as to greatly facilitate the assembling of the layers constituting it.

One object which I have in view consists in providing means by which a plurality of layers of the impregnated material, of which the body is to be constituted, may be "preformed" or partially consolidated to provide composite but uncured plates which may, in turn, be cut to provide what, in effect, are compound layers which may be utilized in the assemblage of the body being formed.

In this connection a still further object of my invention consists in providing means for protecting the exposed surfaces of these "preformed" plates, both during the "preforming" operation and during subsequent handling, this means being such as to, in no way, delay operations or necessitate any additional work.

Heretofore, in making bodies of irregular shape by assembling impregnated layers of fibrous sheet material, positioning them in superimposed relation in a mold and curing them by any suitable means, it has been customary to cut the sheet material to provide individual layers of the desired shape and dimensions and to superimpose these layers, in their proper order or sequence, to provide a body substantially of the desired shape or outline and to then place this body in the mold. Obviously, such a method necessitates separate cutting of each layer of sheet material employed, separate and successive handling of the several layers thus cut, and consequent delay in manufacture. It also results in the encountering of considerable difficulty in the proper positioning of the sheet material within the mold.

Broadly speaking, my invention comprehends the partial consolidation or "preforming" of a plurality of superimposed layers of sheet material, impregnated with a proper binder, into plates or sheets, so that a compound sheet or plate thus "preformed" may be handled, cut and the like in the same manner as a single sheet of the material might be. For example, "preformed" plates of considerable thickness, relative to the thickness of the individual layers employed, may be provided, and sections may be cut from these plates to proper shapes and sizes so that, when they are superimposed, in the same manner that the successive single layers have been previously superimposed, they will form a body substantially approximating the shape and size desired.

Figure 2:

In the drawing, in the several views of which corresponding reference numerals indicate like parts, Figure 1 is a perspective view of a "preformed" plate, and Fig. 2 is a sectional view through a body constructed by employing plates similar to that shown in Fig. 1.

In practising my invention, I may utilize any suitable fibrous sheet material, such as cloth, duck, paper, cotton batting or the like, impregnated with any suitable adhesive which may be hardened by a proper curing operation. Many adhesives or binders are suitable for the purpose, such as shellac, or "shellac substitutes" such as copal or casein compounds, various resins and the like, but I preferably employ a phenolic condensation product, such as the well known bakelite.

When a phenolic condensation product is employed, the sheet material may be impregnated with the condensation product in solution and may then be heated sufficiently to drive off the solvent, leaving the sheet and the binder, located in, and adhering to, it in a dry state so that it may be conveniently handled. The drying, however, should not be carried to such an extent, or conducted at such temperatures, as to transform the binder into its final, hard, infusible and insoluble state.

A plurality of layers of suitable material, thus impregnated, may be superimposed upon a single sheet of unimpregnated material of suitable character, such as cloth, paper or the like, and a further sheet of untreated material may then be positioned upon the superimposed layers or sheets of impregnated material. The entire material, thus assembled, may then be placed in a suitable press and subjected to a moderate degree of heat and pressure. The heat and pressure thus applied, however, should be only sufficient to somewhat soften the binder and compress the several layers slightly in order that the softened binder, after being cooled, may hold them together.

In order that the material shall not stick to the platens or press plates, it is necessary that the press plates be not only polished, to a greater or less degree, but that they also be coated with grease or equivalent material. Obviously, this greasy coating would be transferred to the material treated in the press and, presumably, would have to be removed, by the use of sand paper or other means, in order to provide the "preformed" plate with clean, rough surfaces before combining a number of such plates in a mold under ordinary conditions but such complications are avoided by providing protective layers of untreated sheet material which, at the proper time, may be readily pulled off from the upper and lower surfaces of the "preformed" plate or from sections cut from the plate.

Preferably, sections of the desired shapes and dimensions are cut from the "preformed" plate, while its protective layers are still adhering to it. This cutting may be accomplished by any suitable and well known means such, for example, as a band saw.

After the desired number of sections have been cut from a plate to the proper shapes and dimensions, they may be successively positioned in a suitable mold, being superimposed, one upon another, in the proper order within the mold, care being taken that the protective coatings are pulled or peeled from their surfaces, before they are positioned in the mold, so that clean, rough surfaces may be exposed for engagement against each other. When the body has thus been assembled in the mold, the mold may be closed and heat and pressure may be applied, in any suitable manner, to compress the assembled body and convert its binder to its final, hard, infusible and insoluble state.

Referring more particularly to the drawings, Fig. 1 discloses a "preformed" plate 1 which may comprise a plurality of superimposed layers 2 of fibrous sheet material, impregnated with a binder. This sheet material may be duck, or other cloth, paper or cotton batting, and the binder may be of any desired type although a phenolic condensation product is preferred. Protective layers 3 of suitable sheet material, preferably untreated with any binder, are held against the upper and lower faces of the plate by the adhesive of the adjacent layers which has been rendered active, to a slight degree, by the relatively slight application of heat and pressure which has been applied to the assembled body in a press. While this heat and pressure have been sufficient to partially consolidate or "preform" the plate and to render the binder active to a certain extent, it has not been sufficient to prevent separation of the layers by manual means, if desired, or to, in any way, prohibit peeling off of the protective sheets.

A plate thus preformed may be handled with the same facility as a single sheet of similar material and from it may be cut "compound" layers which may subsequently be molded in superimposed relation to provide a finished body of any suitable character.

Such a finished body is conventionally shown at 4 in Fig. 2 as comprising a plurality of superimposed "compound" layers 5, each constituting a section of a "preformed" plate 1. These "compound" layers or sections have been cut from a "preformed" plate, the protective sheets have been removed from the layers or sections, the layers or sections have been superimposed on each other and the body thus assembled has been cured by heat and pressure in a suitable mold.

While this method is particularly applicable to the formation of bodies of irregular shape, in which are embodied a multiplicity of layers of slightly differing shape and size, I have, for the sake of simplicity, illustrated a body of rectangular cross section as fully disclosing my invention, which consists, broadly, in "preforming" a "compound" plate, or layer, by superimposing sheets of material impregnated with a binder between protective coatings of unimpregnated material which may be peeled off from sections of the plate which are to be molded together into a final, unitary, solid body.

Because of the various applications of my invention and the numerous changes, both in the materials employed and in the manner of their use, which are possible, I wish no restrictions to be imposed upon my invention other than those indicated in the claims.

I claim as my invention:

1. The method of forming bodies of superimposed layers of fibrous material and a binder which comprises superimposing layers of impregnated fibrous material between layers of unimpregnated material, slightly curing the plate thus assembled to cause adhesion between the several layers, dividing the plate into sections, removing the protective layers from the sections to expose clean surfaces, superimposing the sections and curing the body thus assembled.

2. The method of forming bodies of superimposed layers of fibrous material and a phenolic condensation product as a binder which comprises superimposing layers of sheet material impregnated with the binder between protective layers of untreated material, subjecting the plate thus assembled to heat and pressure sufficient to partially compact it and soften the binder without materially curing it, dividing the plate into sections, removing the protective coatings from the sections, superimposing certain of the sections and subjecting the body thus assembled to heat and pressure sufficient to fully compact it and transform its binder into its hard and substantially insoluble and infusible state.

3. The step in the process of forming bodies of superimposed layers of fibrous material and a binder which comprises superimposing layers of such material impregnated with the binder between layers of untreated material and partially curing the body thus assembled to somewhat compact it and cause adhesion between the several layers without materially affecting the binder, whereby upon subsequent removal of the untreated material portions of the remaining material may be superimposed and molded into a unitary body.

4. The step in the process of forming bodies of superimposed layers of fibrous material and a phenolic condensation product as a binder which comprises assembling sheets of fibrous material impregnated with the binder between protective coverings and subjecting them to heat and pressure to somewhat compact them and cause adhesion between the sheets without transforming the binder to its final, solid and substantially insoluble and infusible state, whereby layers of fibrous material are provided from which the protective coverings may be removed to expose surfaces which may be molded together.

5. The step in the method of forming composite bodies comprising a fibrous material and a binder which comprises "preforming," by heat and pressure, a quantity of the impregnated fibrous material between protective coverings, which may be subsequently removed to expose clean moldable surfaces.

6. A method of forming bodies of fibrous material and a binder which hardens under the action of heat and pressure which comprises "preforming" a quantity of the binder-impregnated fibrous material between protective coverings without changing the properties of the binder, dividing the body thus formed while still protected by its coverings into sections, removing the coverings from the sections to expose clean surfaces, superimposing the sections, and subjecting the body thus assembled to heat and pressure to transform its binder into its final, solid and substantially insoluble and infusible state.

7. The method of forming bodies of fibrous material impregnated with a binder which comprises "preforming" a plurality of sections composed essentially of fibrous material and a binder while keeping them covered with protective coatings, removing the protective coatings to expose clean surfaces, assembling the sections with their clean surfaces in engagement and subjecting the assembled sections to heat and pressure to consolidate the entire body and harden the binder.

In testimony whereof, I have hereunto subscribed my name this 21st day of Dec., 1918.

DANIEL ADAM DICKEY.